United States Patent [19]

Hidle

[11] Patent Number: 4,574,776
[45] Date of Patent: Mar. 11, 1986

[54] COOKING UTENSIL

[75] Inventor: Jerry Hidle, Panama City, Fla.

[73] Assignee: Panhandle Industries, Inc., Panama City, Fla.

[21] Appl. No.: 617,530

[22] Filed: Jun. 5, 1984

[51] Int. Cl.$^4$ .............................................. F24D 1/00
[52] U.S. Cl. ..................................... 126/369; 99/413; 220/428; 220/23.83
[58] Field of Search ....................... 126/369, 348, 377; 99/413; 219/385, 401; 220/428, 23.83; 426/510, 511, 523

[56] References Cited

U.S. PATENT DOCUMENTS

| 119,169 | 9/1871 | Ogden | 126/369 |
| 322,774 | 7/1885 | Armstrong | 126/369 |
| 450,328 | 4/1891 | Dunham | 126/369 |
| 3,528,401 | 9/1970 | Moore | 126/369 |
| 4,397,298 | 8/1983 | Abell | 126/369 |
| 4,462,308 | 7/1984 | Wang | 126/369 X |

FOREIGN PATENT DOCUMENTS

| 140651 | 9/1930 | Switzerland | 126/369 |
| 330764 | 8/1958 | Switzerland | 126/369 |

Primary Examiner—Randall L. Green
Attorney, Agent, or Firm—Watson, Cole, Grindle & Watson

[57] ABSTRACT

Disclosed is a cooking utensil which is adapted to cook foods by steaming as well as by convection heating. The cooking utensil comprises an outer vessel having a generally upstanding side wall in a generally cylindrical configuration and a generally planar bottom having at least one aperture therein, and an inner vessel having a sidewall and a bottom located within the outer vessel, the sidewall and bottom of the inner vessel spaced from the sidewall of the outer vessel, the annular space formed by the upper portion of the inner vessel and the upper portion of the sidewall of outer vessel communicating with the interior of the inner vessel.

2 Claims, 21 Drawing Figures

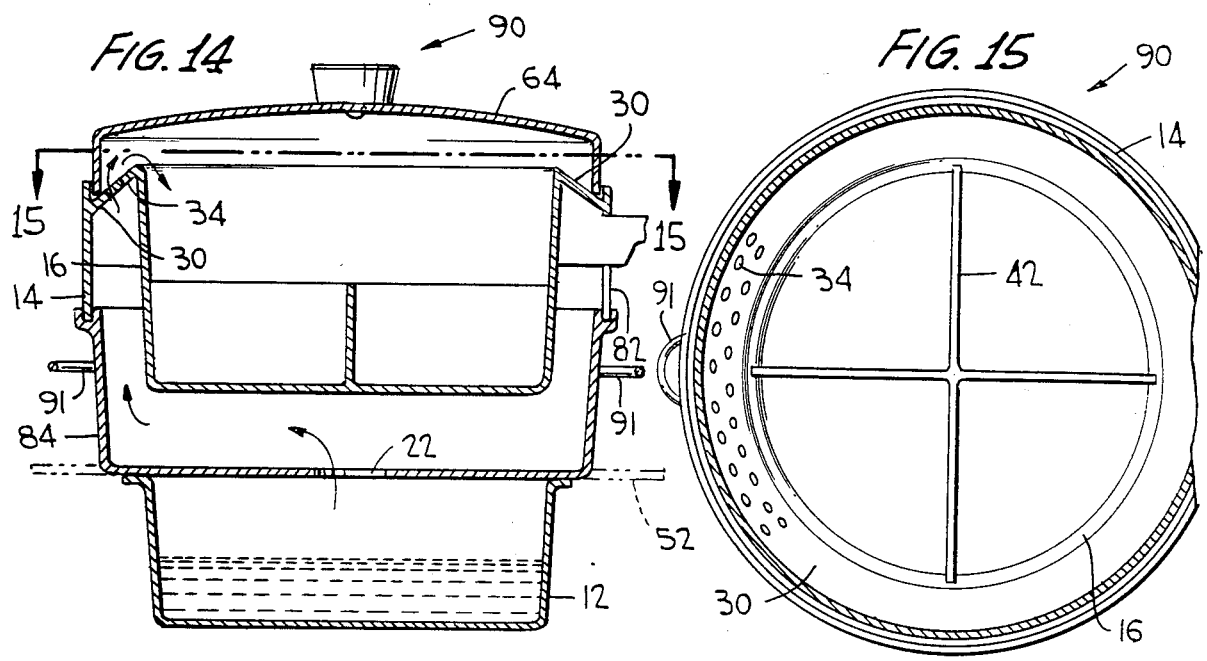
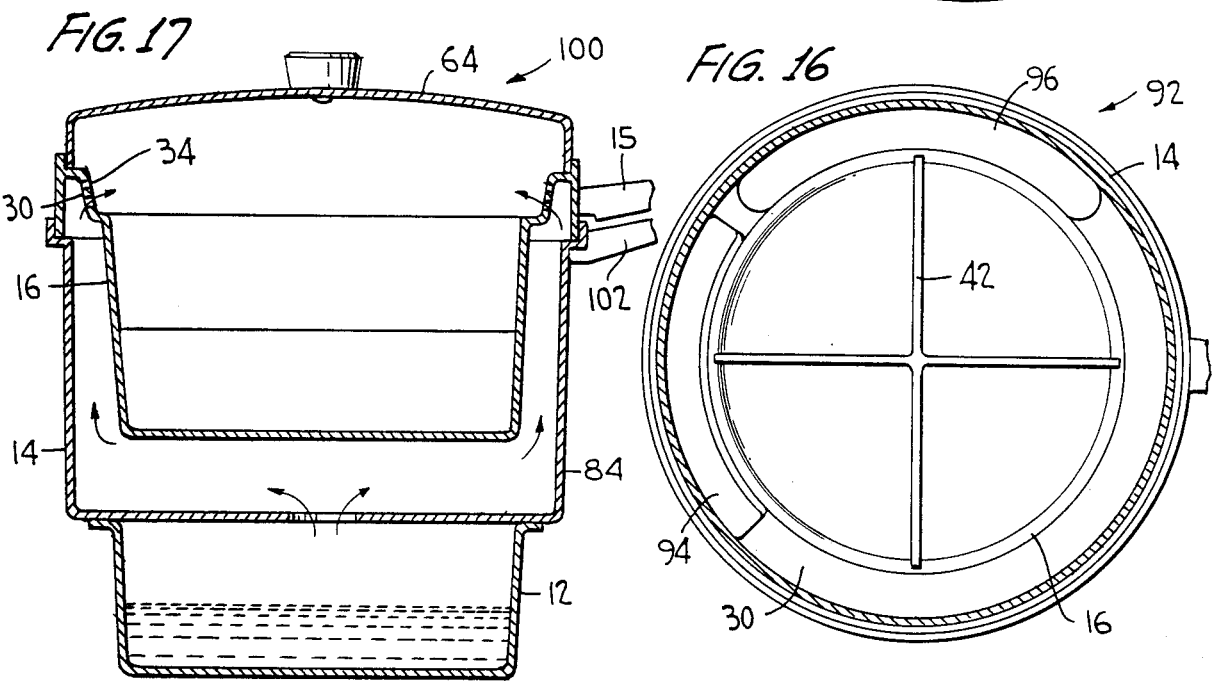
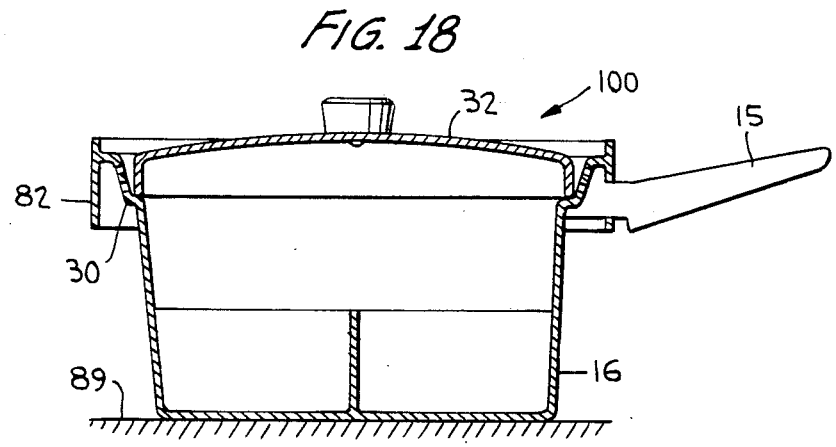

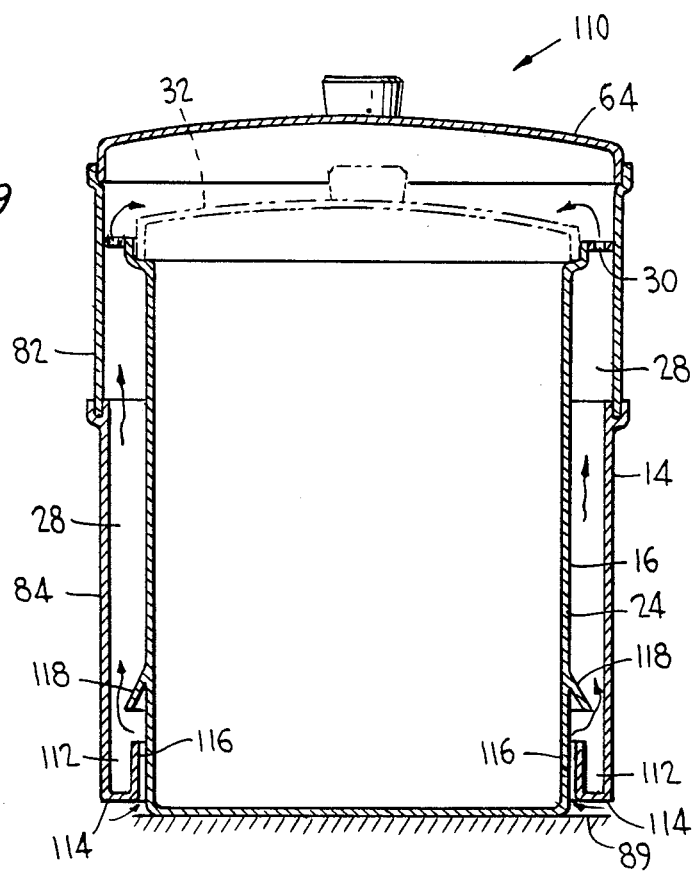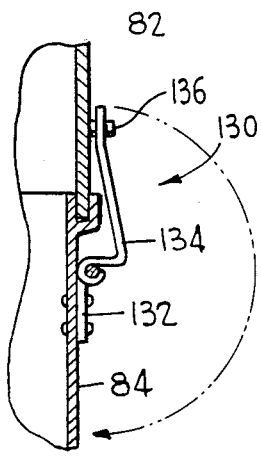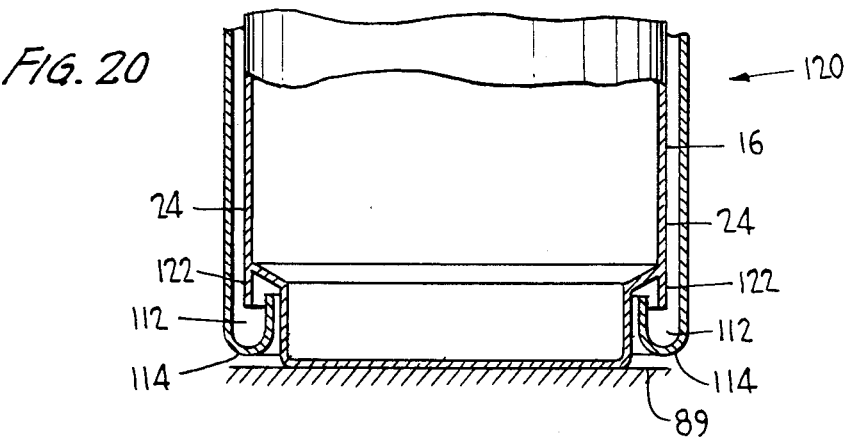

COOKING UTENSIL

BACKGROUND OF THE INVENTION

The present invention relates generally to cooking utensils and, more specifically, to cooking utensils which are particularly adapted for use in steaming foodstuffs and which may also be used to heat and cook foodstuffs by convection and conduction heating.

Although numerous types of cooking utensils, e.g., pots pans, steamers and the like, have been used for many years, most if not all of these cooking utensils are adapted for use in only one type of cooking. For example, conventional pots and pans utilize the heat from a heat source such as the burner of a kitchen range, to heat the bottom and sidewalls of the pot or pans to conductively heat and cook the food contained therein. On the other hand, steamers utilize the heat contained in vaporized water or other liquid to heat and cook food. Generally, the specific particular construction of the cooking utensil does not allow the utensil to be used for a different type of cooking.

Specific examples of cooking utensils which are generally adapted to one mode of cooking are the utensils disclosed in U.S. Pat. Nos. 822,569 to Appleton; 1,003,112 to Johnson; 1,115,303 to Geffroy; 1,263,004 to Tollagsen; 2,282,400 to Ginnel; 3,141,455 to Dumbeck; and 4,373,511 to Miles et al. A single cooking utensil which is capable of cooking foods in several manners would be desirable since, among other things, there would be no need for a plurality of cooking utensils and thus the storage space necessary in the cooking area could be reduced.

SUMMARY OF THE INVENTION

Accordingly, it is therefore an object of the present invention to provide a cooking utensil which may be adapted to cook foodstuffs by steaming and by convection heating such as heated air as well as by conventional conduction heating.

Another object of the present invention is to provide a cooking utensil which, when used for cooking foodstuffs, tends to minimize the loss of minerals, vitamins, spices and the like.

A further object of the present invention is to provide a cooking utensil which allows particulate material such as spices and other such ingredients to be added to foodstuff being cooked without significant loss of the particulate materials.

Briefly, these objects are achieved by the present invention which, in its broader aspects, comprehends a cooking utensil comprising an outer vessel having generally a upstanding sidewall in a generally cylindrical configuration and a generally planar bottom having at least one aperture therein, and an inner vessel having a sidewall and a bottom located within the outer vessel, the sidewall and bottom of the inner vessel spaced from the sidewall and the outer vessel, the annular space formed by the upper portion of the inner vessel and the upper portion of the sidewall of outer vessel communicating with the interior of the inner vessel.

The present invention further comprehends a cooking utensil comprising an outer vessel having a generally upstanding sidewall in a generally cylindrical configuration and an open bottom, and an inner vessel having a sidewall and a bottom said inner vessel located within the outer vessel with the sidewall of the inner vessel spaced from the sidewall of the outer vessel thereby forming an annular space which communicates with the interior of the inner vessel, the lower portion of the outer vessel having a collecting means comprising an inwardly directed flange portion and an upwardly directed wall portion extending into the annular space and spaced from the sidewall of the inner vessel.

Further objects, advantages and features of the present invention will become more fully apparent from a detailed consideration of the arrangement and construction of the constituent parts as set forth in the following description taken together with the accompanying drawings.

BRIEF DESCRIPTION OF THE DRAWINGS

In the drawings,

FIG. 14 is a cross-sectional view of yet another embodiment of a cooking utensil in accordance with the present invention, FIG. 15 is a top plan view of the embodiment shown in FIG. 14, FIG. 16 is a top plan view of an embodiment similar to that of FIG. 15, FIG. 17 is cross-sectional view of another embodiment of the invention, FIG. 18 is a cross-sectional view of a portion of the embodiment of FIG. 17 which illustrate one mode of utilizing the embodiment, FIG. 19 shows a further embodiment of the cooking utensil according to the invention, FIG. 20 is a cross-sectional view showing a portion of another embodiment of the invention, and FIG. 21 is a cross-sectional view showing a latch which may be used with the various embodiments of the invention.

DETAILED DESCRIPTION OF THE PREFERRED EMBODIMENTS

Figure 1:
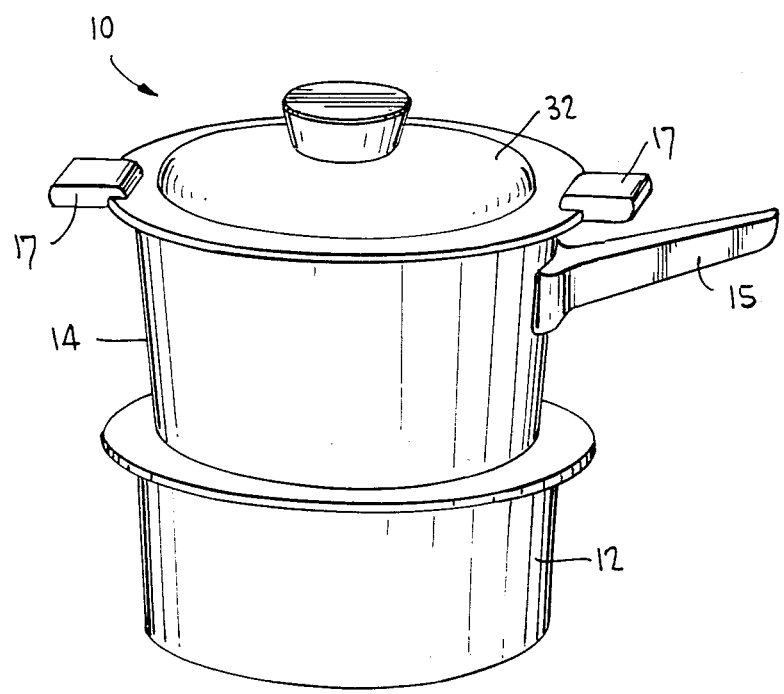
FIG. 1 is a perspective view of one embodiment of a cooking utensil in accordance with the present invention.
Figure 2:
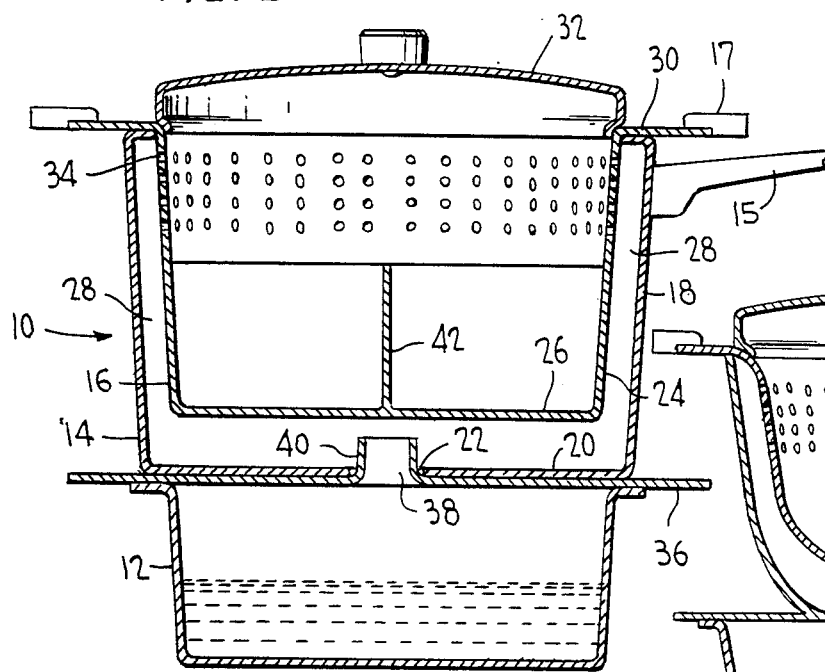
FIG. 2 is a cross-sectional view of the cooking utensil shown in FIG. 1.

Referring to FIGS. 1 and 2 of the drawings, shown is cooking utensil 10 in accordance with the present invention. Utensil 10 is illustrated in conjunction with boiler 12 which may be a conventional pot or pan, the cooking utensil being supported by the boiler. Cooking utensil 10 comprises outer vessel 14 having handle 15 and inner vessel 16 having two handles 17. Outer vessel 14 is of a generally cylindrical configuration and has a generally upstanding sidewall 18 and a generally planar bottom 20 which has at least one aperture 22 therein. Inner vessel 16 has sidewall 24 and a bottom 26, the sidewall and the bottom of the inner vessel being spaced a short distance from the sidewall bottom of the outer vessel, the spacing between the sidewalls forming annular space 28. Inner vessel 16 is suspended within outer vessel 14 by means of outwardly directed flange 30 resting upon the upper portion of the outer vessel. By being suspended in outer vessel 14, inner vessel 16 can be removed for cleaning or for use as a separate utensil for cooking and the like. Removable lid 32 encloses the top of inner vessel. To provide communication between annular space 28 and the interior of inner vessel 16, perforations 34 in the upper portion of sidewall 24 are provided. Preferably, perforations 34 are located in the upper one half of sidewall 24, most preferably in the upper one third of the sidewall. In contrast to conventional steam cooking utensils, spices and other ingredients can be added to food stuffs being cooked in utensil 10 without significant loss by having perforations 34 in the upper portion of sidewall 24.

Interposed between cooking utensil 10 and boiler 12 is extender plate 36 of generally planar configuration. Extender plate 36 contains aperture 38 which is concentric with aperture 22 in bottom 20 of outer vessel 14 and includes upright collar 40 about aperture 38 which extends through the aperture in the bottom of the outer vessel. Upright collar 40 engaging aperture 22 stablizes and helps to prevent utensil 10 from sliding or moving off boiler 12. Extender plate 36 allows cooking utensil 10 to be utilized in conjunction with boiler 12 which has a larger outside diameter than the utensil.

The interior of inner vessel 16 is provided with partitions 42 forming food compartments so that different foods can be cooked simultaneously. Partitions 42 can be removable or integral with inner vessel 16. Partitions 42 also provide a convenient support for a horizontal grill (not shown) which can be used to keep foods elevated from juices and condensate which collect in the bottom of the vessel 16.

In use, boiler 12 containing a supply of water or other liquid is placed on a source of heat such as the burner of a conventional kitchen range. Extender plate 36 is then placed over boiler 12 and cooking utensil 10 situated on the extender plate such that aperture 22 of outer vessel 14 is over collar 40 of the extender plate. Steam generated in boiler 12 passes upwardly through apertures 22 and 38, about bottom 20, into annular space 28, and then into the interior of inner vessel 16 via the perforation 34 in sidewall 24 of inner vessel 16. Foodstuffs located in the interior of inner vessel 16 are then heated by the action of the steam. Alternatively, cooking utensil 10 can be placed directly on a source of heat such as the burner of a conventional kitchen range. Food contained in inner vessel 16 would then be cooked by convection heat.

Figure 3:
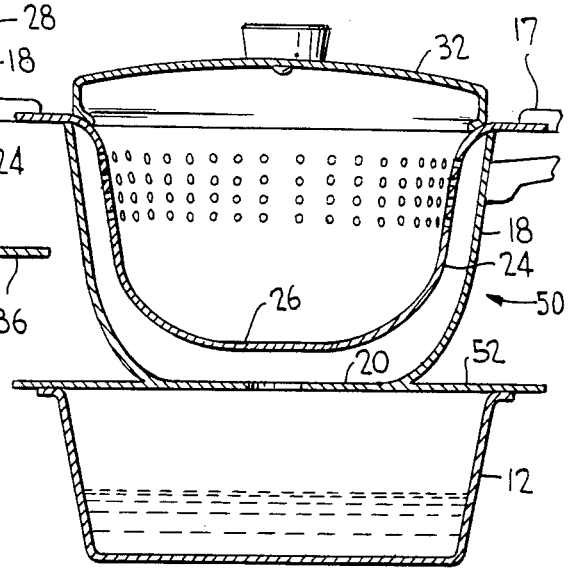
FIG. 3 is cross-sectional view of another embodiment of the invention.

Cooking utensil 50 as is shown in FIG. 3 is very similar to cooking utensil 10 as is shown in FIG. 1, the basic differences being that sidewall 18 of outer vessel 14 and sidewall 24 of inner vessel 16, rather than being of a generally planar configuration, are dish shaped at their lower portion. In addition, extender plate 36 is not used in this embodiment, exterior flanges 52 which extend horizontally from bottom 20 of outer vessel 14 enable cooking utensil 50 to be placed on boiler 12 of a larger diameter.

Figure 4:
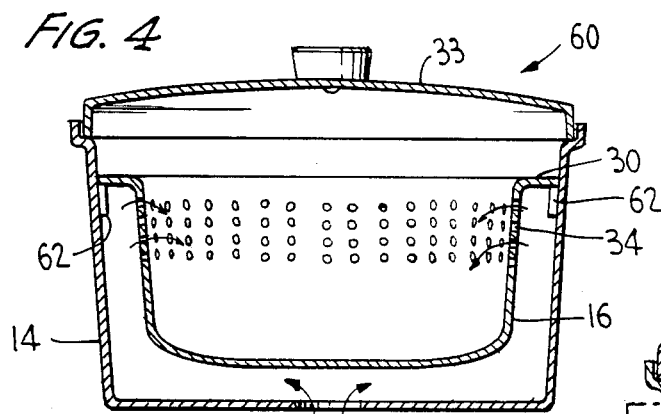
FIG. 4 is a cross-sectional view of yet another embodiment of the invention.

Cooking utensil 60 as shown in FIG. 4 also is very similar to the embodiment of the invention as illustrated in FIG. 1. However, in device 60, flange 30 on inner vessel 16 only extends to the inner surface of sidewall 18 of outer vessel 14, the inner vessel being supported by shoulders 62 attached to the sidewall of the outer vessel. Removable lid 33 encloses the top of outer vessel 14.

Figure 5:
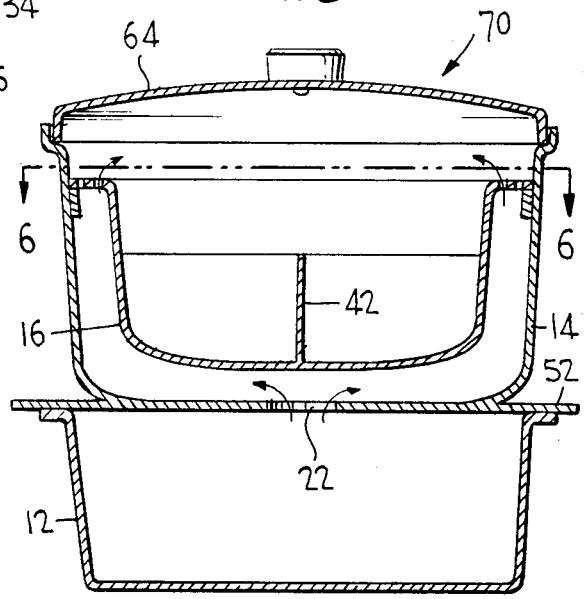
FIG. 5 is a cross-sectional view of yet another embodiment of the invention.
Figure 6:
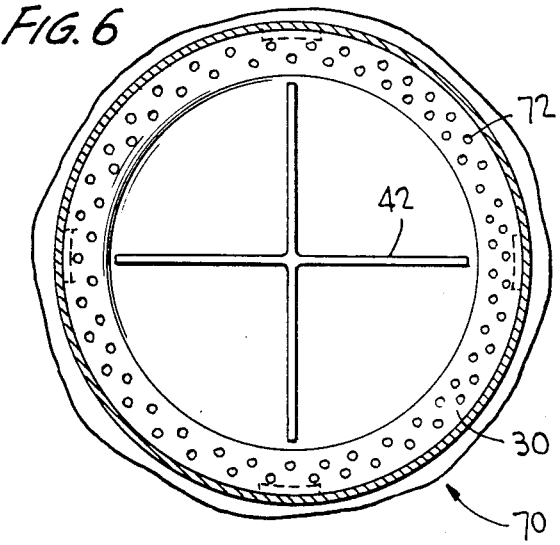
FIG. 6 is a cross-sectional view of the cooking utensil illustrated in FIG. 5.

Cooking utensil 70 of FIG. 5 is similar in most respects to cooking utensil 60 of FIG. 4. In cooking utensil 70, perforations 72 are formed on flange 30 of inner vessel 16 instead on the sidewall 24 of the inner vessel. In addition, cooking utensil 70 includes integral flange 52, like cooking utensil 50 of FIG. 3, which enables cooking utensil 70 to be placed on boiler 12 of a larger diameter. FIG. 6 is a top plan view of cooking utensil 70 with lid 64 removed illustrating perforations 72 on flange 30.

Figure 8:
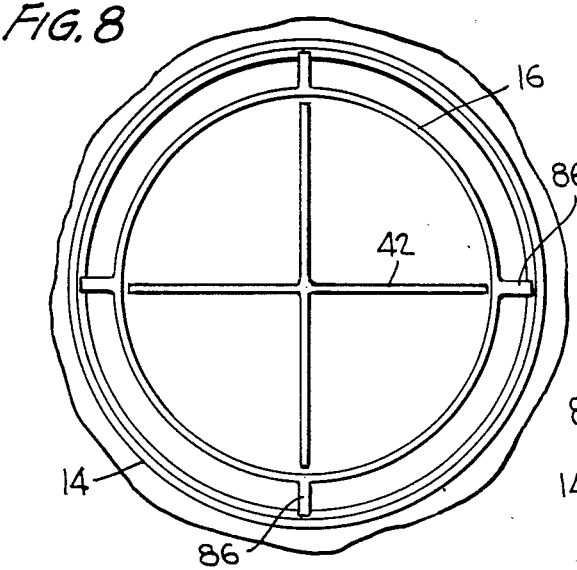
FIG. 8 is a top plan view of the utensil of FIG. 7 with the lid of the utensil removed.
Figure 7:
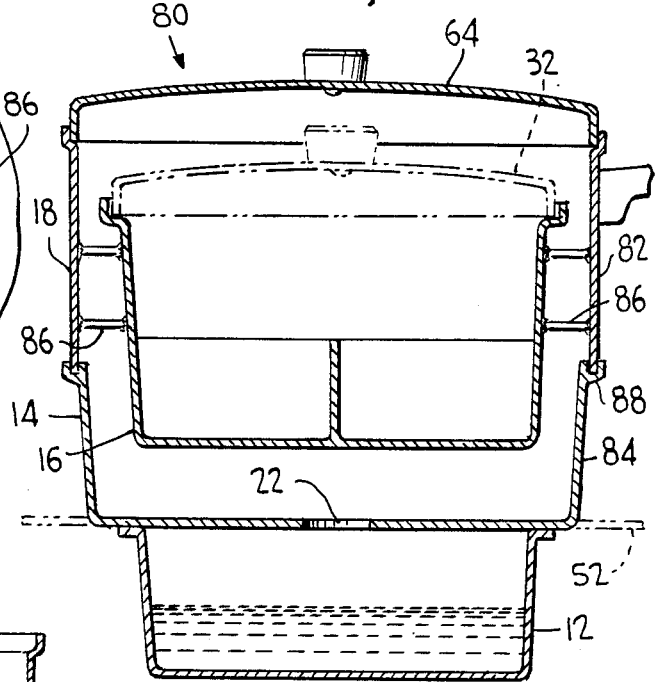
FIG. 7 is a cross-sectional view of another embodiment of the present invention.

FIGS. 7 and 8 illustrate another embodiment of a cooking utensil according to the present invention. Cooking utensil 80 differs from the previously described embodiments in that sidewall 18 of outer vessel 14 is in two sections, upper section 82 and lower section 84. Inner vessel 16 is joined to upper section 82 by outwardly extending arms 86. The upper portion of lower section 84 is provided about its periphery with upwardly directed channel 88, the lower portion of upper section 82 resting in this channel. It should be noted that the lower portion of upper section 82 is higher in elevation than bottom 26 of inner vessel 16. FIG. 8 is a top plan view of cooking utensil 80 with lid 64 removed showing partitions 42 within the interior of inner vessel 16 and arms 86 extending from the inner vessel to outer vessel 14. It should be noted that, with the exception of arms 86, annular space of utensil 80 is entirely open, that is, does not contain any perforations.

Figure 9:
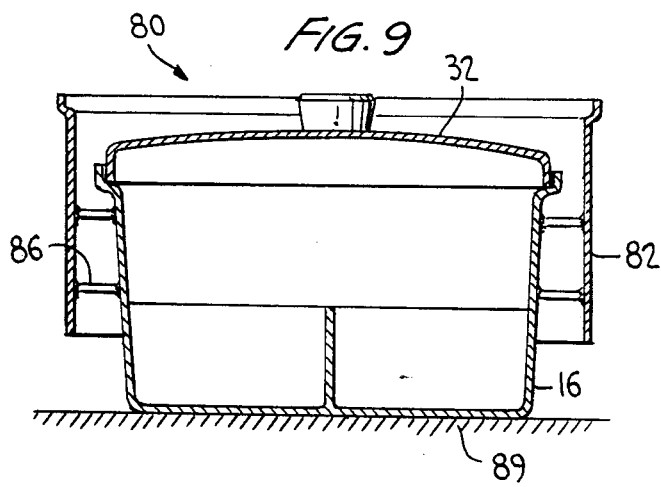
FIG. 9 illustrates the use of a portion of the utensil shown in FIG. 7, FIGS. 10, 11, 12 and 13 illustrate the various configurations which the aperture in the bottom on the cooking utensil may take.

Cooking utensil 80 as shown in FIG. 7 may be used for cooking in exactly the same manner as cooking utensil 10 in FIG. 1. However, when upper section 82 is separated from lower section 84 of outer vessel 14, cooking utensil 80 can be used in a manner illustrated in FIG. 9. As is shown, cooking utensil 80 provided with lid 32 which closes inner vessel 16 and thus the utensil can be placed directly on heating surface 89 and used as a conventional cooking utensil for frying, boiling and the like.

Preferably, upper portion of upper section 82 is higher than upper portion of inner vessel 16 such that lid 64 can be placed on the upper section while lid 32 is in place. Such a construction, among other things, facilitates storage of all the components of cooking utensil 80 and its accessories.

Figure 10:
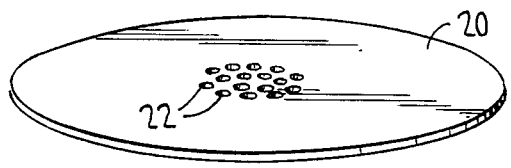
Figure 11:
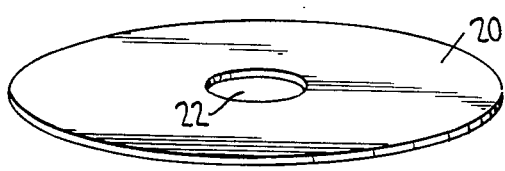
Figure 12:
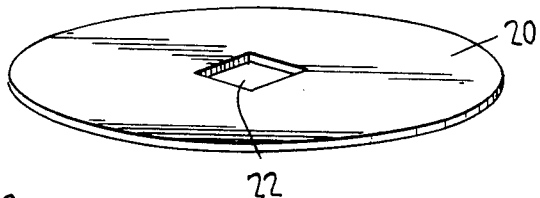
Figure 13:
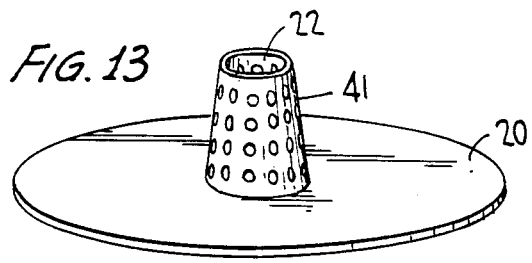

FIGS. 10–13 illustrate various configurations for aperture 22 in bottom 20 of outer vessel 14, sidewall 18 of the outer vessel not being shown for the purpose of clarity. In FIG. 10, aperture 22 comprises a plurality of small holes while in FIG. 11, the aperture is simply one round hole. In FIG. 12, aperture 22 is square in configuration. FIG. 13 illustrates collar 41, somewhat similar to collar 40 provided on an extender plate 36, which extends upwardly and is provided with a plurality of perforations. Although aperture 22 is shown in these embodiments as being located in the center of bottom 20, it should be recognized that aperture could be positioned in other locations on the bottom.

Turning now to FIGS. 14 and 15, shown is cooking utensil 90 which is somewhat similar to the embodiment of the invention shown in FIG. 7, the major difference being that flange 30 on inner vessel 16 connects the inner vessel to the upper section 82 of outer vessel 14. It should be noted that in this embodiment the upper edge of inner vessel 16 is higher than the upper edge of outer vessel 14. Such an arrangement enables inner vessel 16 to be used for other purposes such as, for example, a boiler. Lower portion 84 of outer vessel 14 is provided with handle 91.

Unlike some of the previous embodiments, flange 30 is provided with a plurality of perforations in only a portion of its surface as is shown in the top plan view of FIG. 15 where the lid 64 on cooking utensil 90 has been removed. For most applications, this reduced number of perforations still allows sufficient steam to enter inner vessel 16 to enable one to cook most foods in a short period of time. Preferably, the area of flange 30 containing perforations 34 is about one quarter to about one half, most preferably about one third, of the total area of the flange. By providing perforations on only a portion of flange 30, the safety of cooking utensil 90 is enhanced. If steam or superheated convection air is allowed to rise all around inner vessel 16, it is difficult to work with the food contained inside the vessel. If, however, only a fraction of flange 30 is open, then the food can be easily examined by approaching it from the side of the flange that contains no perforations.

FIG. 16 shows an embodiment, similar to cooking utensil 90, wherein flange 30 of utensil 92 is open about a portion of its circumference instead of containing perforations. This configuration for flange 30 provides the same safety advantages that were attributed to construction of utensil 90.

In addition, flange 30 of utensil 92 is provided with thin, flat semicircular band 94 which is slidably carried in grooves in the flange. Band 94 can be rotated from the position shown so as to close opening 96 and thus utensil 92 can be used as a conventional double boiler.

FIGS. 17 and 18 show yet another embodiment of the present invention which is quite similar to the embodiments illustrated in FIGS. 7 and 14. In FIG. 17, flange 30 of utensil 100 is constructed such that it provides a convenient support area for both lid 32 and lid 64 with the portion of the flange having perforations 34 being generally vertical.

In this embodiment, lower portion 84 of outer vessel 14 is provided with handle 102 which projects outwardly from utensil directly beneath handle 15. Thus, both handle 15 and 102 can be joined together or both grasped with one hand. It should be noted that handle 15 extends through upper portion 82 of outer vessel 14 to inner vessel 16 and is attached thereto by molding and the like.

FIG. 18 illustrates the use of cooking utensil 100 with lower section 84 of outer vessel 14 removed such that the cooking utensil can be utilized in conduction heating on heated surface 89. Lid 32 encloses the top of inner vessel 16.

FIG. 19 illustrates yet another embodiment of the invention. Cooking utensil 110, like the embodiments of FIGS. 7, 14 and 17 includes inner vessel 16 and outer vessel 14 having upper section 82 and lower section 84, the upper section being joined to the inner vessel by flange 30. However, in this embodiment, outer vessel 14 does not contain a bottom but instead has collecting means 112 on the lower portion of lower section 84. Collecting means 112 comprises inwardly directed flange portion 114 and upwardly directed wall portion 116 extending into annular space 28 and spaced from sidewall 24 of inner vessel 16. Deflector 118 is provided on the exterior surface of inner vessel 16 such that condensate or other liquid material descending the exterior of the inner vessel is directed into collecting means 112 instead of falling from annular space 28. Although cooking utensil 110 is shown as resting on heating surface 89 in FIG. 19, it should be recognized that the cooking utensil can be utilized in conjunction with a boiler with collecting means 112 resting on the rim of the boiler such that vapors from the boiler ascend through the annular space.

FIG. 20 illustrates the lower portion of cooking utensil 120 which is similar to cooking utensil 110 shown in FIG. 19. In this embodiment, the lower portion of sidewall 24 of inner vessel 16 is of a reduced diameter relative to the remainder of the vessel and extension 122 of the sidewall 24 extends into collecting means 112. In addition, it should be noted that the inwardly directed flange portion 114 has a curved shape in this embodiment as opposed to the planar shape in the embodiment of FIG. 19.

Turning now to FIG. 21, shown is one embodiment for a means to releasably latch upper section 82 and lower section 84 of outer vessel 14. As is shown, latching means 130 comprises a base plate 132 secured to the upper portion of lower section 84 and hasp 134 hingedly attached to the base. Hasp 134 is capable of extending over pin 136 projecting from the exterior surface of upper section 82 of outer vessel 14. One or more latching means 130 may be provided on the cooking utensils of the invention for safety purposes.

As is apparent from the above description of the preferred embodiments of the present invention, the cooking utensil provided tends to retain ingredients being cooked therein with a minimum amount of precipitated water. In addition, essentially little or no portions of the food being cooked, such as minerals, vitamins, spices and the like, are lost during the cooking process.

While the present invention has been described with reference to particular embodiments thereof, it will be understood that numerous modifications may be made by those skilled in the art without actually departing from the spirit and scope of the invention as defined in the appended claims.

What is claimed as new and desired to be secured by Letters Patent of the United States is:

1. A cooking utensil comprising, an outer vessel having a generally upstanding side wall of generally cylindrical configuration and a generally planar bottom wall having at least one aperture therein, an annular outwardly extending ledge at the upper end of said side wall, an outwardly extending handle mounted on said side wall, an inner vessel having a side wall and a bottom wall respectively spaced inwardly of said side wall and bottom walls of said outer vessel to define an annular space between said side and bottom walls, an outwardly extending handle on said inner vessel, an annular upstanding wall on said inner vessel supported on said ledge and forming an extension of said side wall of said outer vessel, said annular wall being spaced outwardly of said side wall of said inner vessel to define an annular space in communication with the annular space therewith between said side walls, an annular outwardly extending flange interconnecting an upper end of said side wall of said inner vessel with said annular wall, said flange having at least one opening therein for establishing communication between said annular spaces and the interior of said inner vessel, and said flange joining said annular wall below the upper edge thereof to define an annular lip for positioning a lid over said inner vessel when the cooking untensil is employed as a steamer. and wherein said flange has an annular bend at said upper end of said side wall of said inner vessel, inwardly of said at least one opening therein, to define a ledge for positioning another lid over said inner vessel.

2. The cooking utensil according to claim 1, wherein partitions defining food compartments are provided within the inner vessel.

* * * * *